Patented Sept. 18, 1923.

1,468,222

UNITED STATES PATENT OFFICE.

PAUL BALKE AND GUSTAV LEYSIEFFER, OF TROISDORF, NEAR COLOGNE, GERMANY.

PROCESS FOR PRODUCING VULCANITELIKE PLASTIC MATERIALS.

No Drawing.  Application filed December 13, 1920.  Serial No. 430,578.

*To all whom it may concern:*

Be it known that we, PAUL BALKE and GUSTAV LEYSIEFFER, citizens of the Republic of Germany, residing at Troisdorf, near Cologne-on-the-Rhine, Germany, have invented a new and useful Process for Producing Vulcanitelike Plastic Materials; and we do hereby declare the following to be a full, clear, and exact description of the same.

The invention relates to a process for producing vulcanite-like materials or substances. It is already known how to produce such materials or substances by gelatinizing 50 parts by weight of collodion-wool with or without the addition of solvents with at least 50 parts by weight of such uric substances or thiouric substances in which all the hydrogen atoms are substituted by organic radicals or their halogen derivatives. By this process a material similar to celluloid was obtained, which, however, failed to be taken up by the industries.

It has now been found, that a vulcanite like material of extraordinary superior qualities may be obtained by mixing about 21 parts by weight of water-containing cellulose derivatives, for instance nitro-cellulose or acetyl-cellulose, without the addition of alcohol or other solvents with about 16 parts by weight of a gelatinizing agent, as for instance trichloricethylaceticanilid, ethylaceticanilid, triphenylphosphate, aceticacidglycerine-esters, phthalicaciddimethylester and so on, that is with a larger quantity of the gelatinizing agent than is required for gelatinizing the quantity of cellulose derivatives present, and adding a very large quantity of an inorganic or an organic filling material, like carbonate of lime, gypsum, heavy spar, powdered cork, asbestos, peat and so on (about 63 parts by weight). This product is then heated until all the water has escaped and is finally introduced into suitable molds to which pressure and heat is applied. The pressed bodies thus obtained have from the beginning the correct dimensions and maintain the same as they do not shrink at all and need not be dried.

The following will serve as an example how the process may be carried out:

About 400 g. nitrocellulose, corresponding to 21 parts, is intimately mixed with 260 g. water and 1200 g. barytes, corresponding to 63 parts, in a kneading machine for about half an hour. To this mixture about 300 g. of one of the usual gelatinizing agents is added, for instance ethylaceticanilid, corresponding to 16 parts. This mixture is intimately kneaded for about an hour at ordinary temperatures. The contents of the mixer is now heated and the kneading is continued until all the water has evaporated. A suitable quantity of the product is then introduced into molds and molded at a temperature of 130° under application of pressure. The molds are then cooled and finally inverted whereupon the finished article drops out of the mold quite ready for use.

It will be understood that slight variations may be made in the proportions of the constituents, time, temperatures and the like, within the scope of the claims, without departing from the spirit or sacrificing any advantages of the invention.

What we claim is:—

1. The process for producing a vulcanitelike plastic material from cellulose esters, which consists in mixing the water-containing derivatives without the addition of volatile solvents with a much larger quantity of a gelatinizing agent than is required for gelatinizing the cellulose esters under treatment, and with an addition of a preponderance of filling materials and finally heating until the water is evaporated.

2. The process for producing a vulcanitelike plastic material from cellulose esters, which consists in mixing intimately together during about half an hour about 400 g. nitrocellulose, about 260 g. water, and about 1200 g. barytes and adding to the mixture about 300 g. ethylaceticanilid, thoroughly kneading together the constituents for about one hour at ordinary temperatures, then heating and kneading until practically all the water is evaporated.

3. The process of manufacturing vulcanite-like articles from cellulose esters, which consists in mixing the water-containing derivatives without the addition of a solvent with a much larger quantity of a gelatinizing agent than is required for gelatinizing the cellulose esters under treatment, and with a preponderance of filling material, heating until the water is evaporated, introducing a quantity into a mold and producing the article by pressing under application of heat.

4. A new article of manufacture made by mixing the water-containing cellulose esters with a much larger quantity of gelatinizing agent than is required for the derivatives present and with a preponderance of filling material, heating until the water is evaporated, introducing into a mold and pressing at raised temperatures.

In testimony whereof, we have signed our names to this specification in the presence of two subscribing witnesses.

PAUL BALKE.
GUSTAV LEYSIEFFER.

Witnesses:
ANTON NORM,
JOSEF STEINKRÜGER.